(12) United States Patent
Takahashi

(10) Patent No.: US 6,708,980 B2
(45) Date of Patent: Mar. 23, 2004

(54) MECHANICAL SEALING DEVICE

(75) Inventor: Hidekazu Takahashi, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/230,265

(22) Filed: Aug. 29, 2002

(65) Prior Publication Data

US 2003/0042681 A1 Mar. 6, 2003

(30) Foreign Application Priority Data

Aug. 31, 2001 (JP) ........................................ 2001-263653

(51) Int. Cl.[7] ................................................. F16J 15/38
(52) U.S. Cl. ........................ 277/380; 277/387; 277/408
(58) Field of Search ................................ 277/377, 379, 277/380, 381, 383, 385, 408, 387

(56) References Cited

U.S. PATENT DOCUMENTS

| | | | | |
|---|---|---|---|---|
| 2,365,046 A | * | 12/1944 | Bottomley | 277/394 |
| 2,433,589 A | * | 12/1947 | Adams | 415/47 |
| 2,615,739 A | * | 10/1952 | Vedovell | 277/374 |
| 2,839,317 A | * | 6/1958 | Haake | 277/385 |
| 2,868,562 A | * | 1/1959 | Heimbuch | 277/385 |
| 2,943,872 A | * | 7/1960 | Cahill et al. | 277/391 |
| 3,059,936 A | * | 10/1962 | Barrett | 277/391 |
| 3,068,012 A | * | 12/1962 | Van Vleet | 277/385 |
| 3,075,780 A | * | 1/1963 | Mayer | 277/353 |
| 3,244,425 A | * | 4/1966 | Wilkinson | 277/390 |
| 3,269,738 A | * | 8/1966 | Baumler et al. | 277/383 |
| 3,452,994 A | * | 7/1969 | Gyory | 277/380 |
| 3,547,452 A | * | 12/1970 | Hirata | 277/358 |
| 3,693,985 A | * | 9/1972 | Dillner | 277/381 |
| 4,058,321 A | * | 11/1977 | Gavrun et al. | 277/357 |
| 4,195,853 A | * | 4/1980 | Otsuka | 277/370 |
| 4,418,919 A | * | 12/1983 | Wentworth | 277/371 |
| 4,421,327 A | * | 12/1983 | Morley et al. | 277/381 |
| RE32,646 E | * | 4/1988 | Wentworth | 277/371 |
| 4,754,981 A | * | 7/1988 | Burns | 277/374 |
| 4,776,598 A | * | 10/1988 | Akema | 277/379 |
| 5,018,749 A | * | 5/1991 | Forch | 277/387 |
| 5,762,343 A | * | 6/1998 | Zutz | 277/371 |
| 5,772,217 A | * | 6/1998 | Poll | 277/383 |

* cited by examiner

*Primary Examiner*—Alison K. Pickard
(74) *Attorney, Agent, or Firm*—Arent Fox Kintner Plotkin & Kahn PLLC

(57) ABSTRACT

Even high viscosity fluid or slurry-contained fluid is securely sealed without deficiency of a liquid sealing device. The sealing liquid device includes an annular packing made of rubber-like elastic material, the annular packing having a secured section fitted with fluid tight to one retaining surface between the first stationary seal ring and the seal flange and having a seal lip section fitting to the other contact face for sealing.

8 Claims, 7 Drawing Sheets

MECHANICAL SEALING DEVICE

BACKGROUND OF THE INVENTION

1. Field of the Invention

This invention relates to a mechanical sealing device and, particularly to the technical field of a mechanical sealing device capable of effectively sealing high viscosity fluid or slurry-contained fluid.

2. Description of the Related Art

There has been a conventional mechanical seal as a related art of the invention, as shown in FIG. 5, which is a half sectional view of a conventional mechanical sealing device.

The mechanical seal 100 as the first related art shown in FIG. 5 is constituted as a set that is mounted on a rotary shaft 151 and installed within a stuffing box 150 through fastening bolts 160.

The mechanical seal 100 includes, as principle components thereof, a liquid sealing device 101, a fist seal flange 110, a second seal flange 120 and a gas sealing device that are arranged in order, from the inside of the stuffing box 150 toward the outside thereof, in the axial direction.

The liquid sealing device 101 is mounted on the outer circumference of a sleeve 153 secured onto the rotary shaft 151 through a screw socket 152. Between the rotary shaft 151 and the sleeve 153 fitting thereto is disposed an O-ring 154 for sealing therebetween.

In the liquid sealing device 101, a rotary seal ring 102 formed with a rotary seal face 103 is resiliently biased by a spring 105 through a U-shaped gasket 107 and a spacer 108.

Also, a stationary seal ring 112 having a stationary seal face 113 in contact with the rotary seal face 103 is fitted to the inner circumference of the first seal flange 110 through an O-ring 116. Further, at least one pin 115 secured to the stationary seal ring 112 engages a groove provided in the inner circumference of the first seal flange 110 to engage the stationary seal ring 112 with the first seal flange 110.

A gas-sealing device 121 is installed inside of the inner circumference of the second seal flange 120 coupled with the first seal flange 110. The gas-sealing device 121 is provided with a drive sleeve 125 that is secured to the sleeve 153 through at setscrew 126. A second rotary seal ring 122 having a second rotary seal face 123 is fitted in the drive sleeve 125 to slide therein. One end of a fluid passage formed in the second rotary seal ring 122 for creating dynamic pressure is opened at the second rotary seal face 123.

A second stationary seal ring 132 having a second stationary seal face 133 in close contact with the second rotary seal face 123 of the second rotary seal ring 122 is fitted to the inner circumference of the second seal flange 120 through an O-ring 136. In the second stationary seal face 133 are formed a plurality of grooves for creating dynamic pressure, in cooperation with the second rotary seal face 123. Also, the second rotary seal ring 122 is resiliently biased by a coil spring 127 toward the second stationary seal ring 132 side.

The mechanical seal 100 is assembled to the rotary shaft 151 and then the assembly is inserted and installed inside of inner circumferential surface 156 of the stuffing box 150.

An intermediate chamber 130 in which the gas-sealing device 121 is housed is constituted such that the pressure within the intermediate chamber 130 is approximately equal to the atmospheric pressure due to the presence of a drain 128 in the second seal flange 120.

On the other hand, there has been a tandem mechanical seal having a constitution approximately identical to that shown in FIG. 5 (not illustrated in the accompanying drawings. Because the corresponding components are different each other in geometry, each component identical to that in FIG. 5 shall be represented by a combination of the same numeral and a succedent alphabet.) However, the mechanical seal 100A as the second related art is different from the first related art in that the pressure within an intermediated chamber (buffering chamber) 130A is less than that within a liquid chamber 157 and more than the atmospheric pressure (the pressure within the intermediate chamber 130A is approximately a half of that within the liquid chamber 257.). The pressure within the intermediate chamber 130A can be derived from, for example, reducing the pressure within the liquid chamber 157.

It is also a difference from the first related art that a gas sealing device 121A is not a contact type sealing device employed in the first related art but is a non-contact type sealing device. Additionally, in a first seal flange 10A engaging a stationary seal ring, the inside diameter, on the intermediate chamber 130A side, of the first seal flange 110A is approximately equal to that of the stationary seal ring and it is adapted to prevent the pressure within the intermediate chamber 130A from acting on the side face of the stationary seal ring 112A.

If any high viscosity fluid or slurry contained fluid is intended to be sealed using such mechanical seals 100, 100A that are constituted as previously described, then slurries or the like that is contained in the fluid to be sealed will stick on the spacer 108, the spring 105, the gasket 107 and others. Then, those slurries and solid matters will enter between the sliding faces of those components to cause the axial response of the rotary seal ring to be reduced and the surface pressure of the rotary seal face 103 to be worsen, resulting in poor sealing ability.

Specifically, if the response of the rotary seal ring 102 is worsen in the state that the rotary seal face 103 of the rotary seal ring 102 is pushed against the stationary seal face 113, then the rotary seal face 103 will slides relative to the mating surface 113 in the state that the former is subject to a large pressure. Both seal faces will be therefore damaged due to heat generation from sliding action therebetween, causing the sealing ability to be worsen rapidly.

Contrary, if the response is worsen in the state that the surface pressure applied on the rotary seal face 103 is reduced, then the sealing ability of the mating seal faces will be reduced and slurries or the like enter between the rotary seal face 103 and the stationary seal face 113, which causes those seal faces to be damaged.

In such a structure of the mechanical seal 100 shown in FIG. 5, it is difficult to prevent the rotary seal face 103 from being damaged due to heat generation from sliding action, because it is difficult to cool the rotary seal face 103 and the proximity thereof by supplying coolant. This causes the sealing ability of the seal faces 103, 113 to be reduced.

Further, there exists, as the third related art of the invention, a mechanical seal 100B shown in FIG. 6, which has been used as a shaft sealing device in a stirrer, a pump and others for handling magnetic paint for a video tape. In other words, the fluid to be sealed contains slurry.

In FIG. 6, the mechanical seal is installed between a casing 201 and a rotary shaft 202.

As shown in FIG. 6, the rotary shaft 202 fits to and passes through a through-hole 201a. Between the rotary shaft 202 and the casing 201 is disposed a mechanical seal 100B that functions to divide off or tightly seal between a slurry contained fluid area 204 and a sealed liquid area 205.

The mechanical seal 100B is so constituted that a rotary seal ring 206 is fixedly fitted to the rotary shaft 202 and rotates therewith. An O-ring is disposed for sealing between the rotary shaft 202 and the rotary seal ring 206 in order to prevent fluid leakage. The rotary seal ring 206 has a rotary seal face, which in turn closely contacts a mating stationary seal face, thereby to function to seal.

On the other hand, a stationary seal ring 207 is slidably fitted in a through-hole 201A in the casing 201 through an O-ring 209. The O-ring 209 is inserted to fit in an annular groove 211 formed in the through-hole 201A of the casing 201 to seal the space 214 formed between the casing 201 and the stationary seal ring 207.

Also, the stationary seal ring 207 has a stationary seal face at its one end surface. The stationary seal face is in slide contact with the rotary seal face to prevent fluid from flowing into the sealed liquid area 205 from the slurry contained fluid area 204 even though in running condition. The stationary seal face is biased by a spring 210 to forcedly contact the rotary seal face.

During the running rotation of the rotary shaft 202, the sealed liquid 205B supplied to the sealed liquid area 205 through a sealed liquid feed passage 205A applies pressure on the rear of the stationary seal ring 207, thereby to secure that the rotary seal face and the stationary seal face can be in fully contact each other. Accordingly, the contact force between the stationary seal ring 207 and the O-ring 209 is kept to be small to allow the stationary seal ring 207 to displace in the axial direction.

In the mechanical seal 100B constituted as described, during the running of the rotary shaft 202, slurry contained fluid is forced to flow with high pressure and some deposit 204A of slurry contained fluid sinks to accumulate onto the space 214 close to the O-ring 209, and part of the deposit may enter the annular groove 211.

Thus, the response ability of the stationary seal ring 207 to displace axially to follow for the stationary seal face of the stationary seal ring 207 to closely contact the mating rotary seal face becomes poor, which prohibits the sealing action of the stationary seal face to exert. Furthermore, by the increase of accumulation of the deposit 204A in the space 214 and the annular groove 211 every repetition of running and stopping of the device, the stationary seal ring 207 decreasingly loses its ability to follow in the movement direction, resulting in leakage of the sealed fluid through the stationary seal face. This causes the mechanical seal 100B to be disassembled to clean.

Further, if the fluid to be sealed is fluidic foodstuff that is made into slurry by a foodstuff pump, slurries will stick onto the O-ring or the annular groove and then be mixed in during the next stirring process of foodstuff. This violates the Food Sanitation Law. To avoid such a problem, it is required to disassemble to clean the mechanical seal 100B before the start of operation at the next process.

In order to solve the problem described above, as shown FIG. 6, an injection passage 212 having an injection opening at a wall 201B of the casing 201 is provided. Cleaning fluid 212B pumped by a pump (not shown) passes through the injection passage 212. Further, a guide plate 215 is disposed at a position opposing the opening 212A of the injection passage 212 and functions to deflect the ejected cleaning fluid 212B toward the outer circumference of the stationary seal ring 207. After completion of the process operation, the cleaning fluid 212B is injected through the injection passage 212 to wash off the deposit 204A accumulated in the space 214 and the annular groove 211.

However, the injection of the cleaning fluid 212B through the injection passage 212 that is constituted as described above will help to stuff the deposit 204A present in the space 214 further inward of the annular groove 211. It is also a problem that the injection passage 212 is often clogged with the deposit 204A during operation. The clogging deposit 204A is disadvantageously mixed in the material at next process.

This invention is achieved in view of such problems as described previously, the technical problem to be solved by the invention is to prevent slurries, deposit and solid matter of the fluid from sticking onto the moving sections of a liquid sealing device to cause the movement of the moving sections to be worsen, resulting in poor sealing ability.

It is another technical problem to be solved by the invention is to improve and strengthen the sealing force, wherein a seal ring is biased with a resilient force of a packing mounted in the liquid sealing device and additionally with a fluid force acting on the packing.

It is further to maintain the surface pressure response to the seal face of the seal ring to be always constant.

It is also to cool fluid efficiently for preventing the increase of heat generation in sliding movement of the seal ring.

BRIEF SUMMARY OF THE INVENTION

This invention is made to solve the technical problems above and therefore the technical means for solving them are constituted as follows.

The mechanical seal as the first embodiment according to the invention is one installed between a rotary shaft and a seal flange for sealing high viscosity fluid or slurry contained fluid, comprising: a first rotational seal ring having a relative face and retained with the rotary shaft; a first stationary seal ring having a seal face in close contact with the relative seal face and biased with a resilient means supported by the seal flange, the first rotational seal ring being engaged with the seal flange so as to rotate therewith; and an annular packing made of rubber-like elastic material, the annular packing having a secured section mounted with fluid tight to a retaining face on one side between the first stationary seal ring and the seal flange and having a seal lip section fitting with fluid tight to a contact face on the other side, the packing biasing the first stationary seal ring toward the seal face.

In the mechanical seal according to the first embodiment of the invention, the packing is, at its secured section, fixed with fluid tight on the retaining face of one member, while, at free end of its seal lip section, closely contact the mating face of the other member. Accordingly, when slurry contained fluid sticks, the packing elastically deforms at the seal lip section thereof, enabling the response to the surface pressure applied on the stationary seal ring to be always fully exerted.

DETAILED DESCRIPTION OF THE INVENTION

Now, mechanical sealing devices 1 as preferred embodiments of the invention are hereinafter described in detail, referring to the accompanying drawings, which are design drawings.

Figure 1:
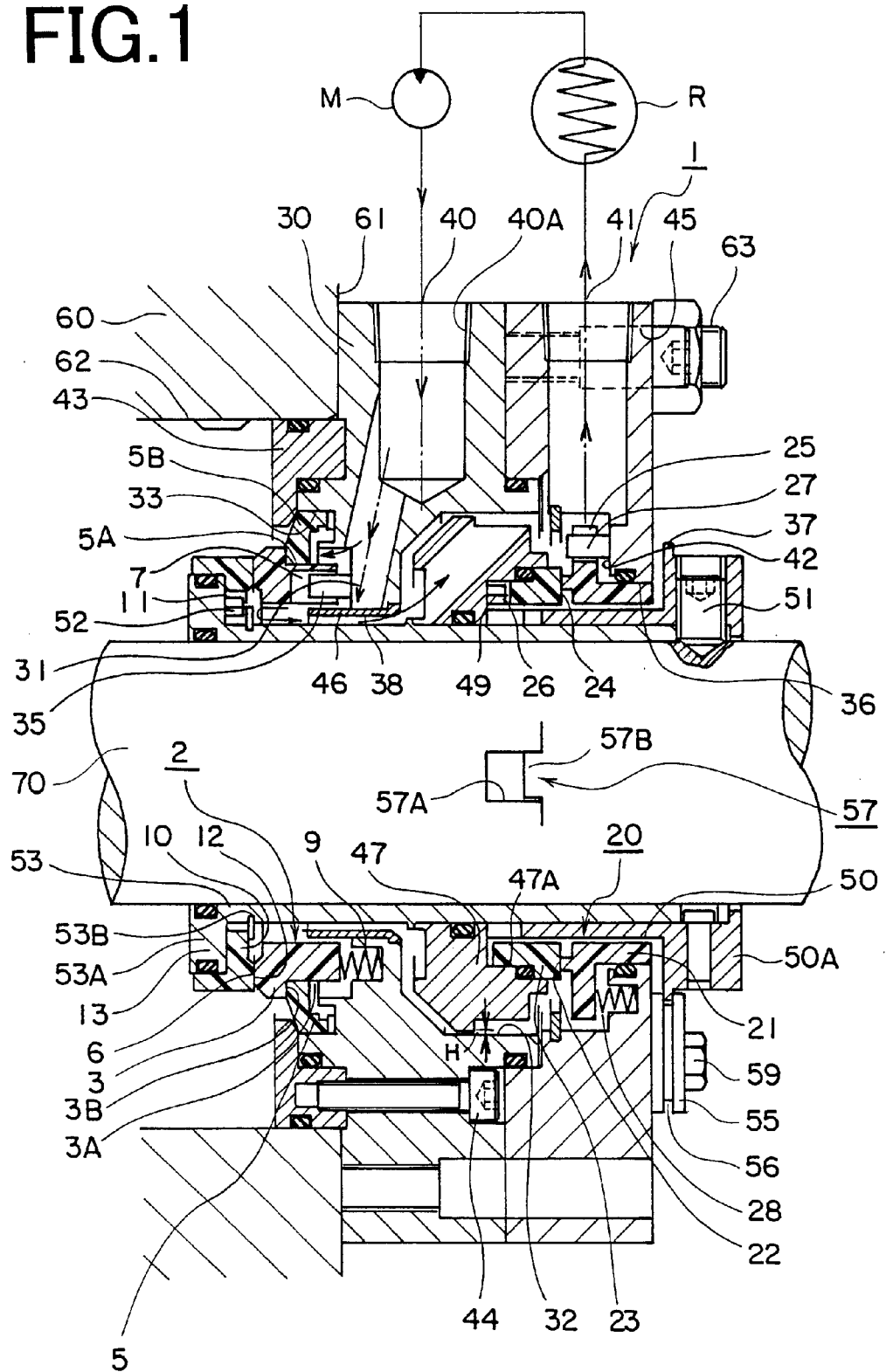
FIG. 1 is a sectional view, showing a mechanical sealing device as a preferred embodiment according to the invention that is installed between a seal flange and a rotary shaft.

FIG. 1 shows a mechanical sealing device 1 as the first preferred embodiment according to the invention. The mechanical sealing device 1 as a cartridge is installed on the device body (stuffing box) 60 and the external face of the rotary shaft 70.

Figure 2:
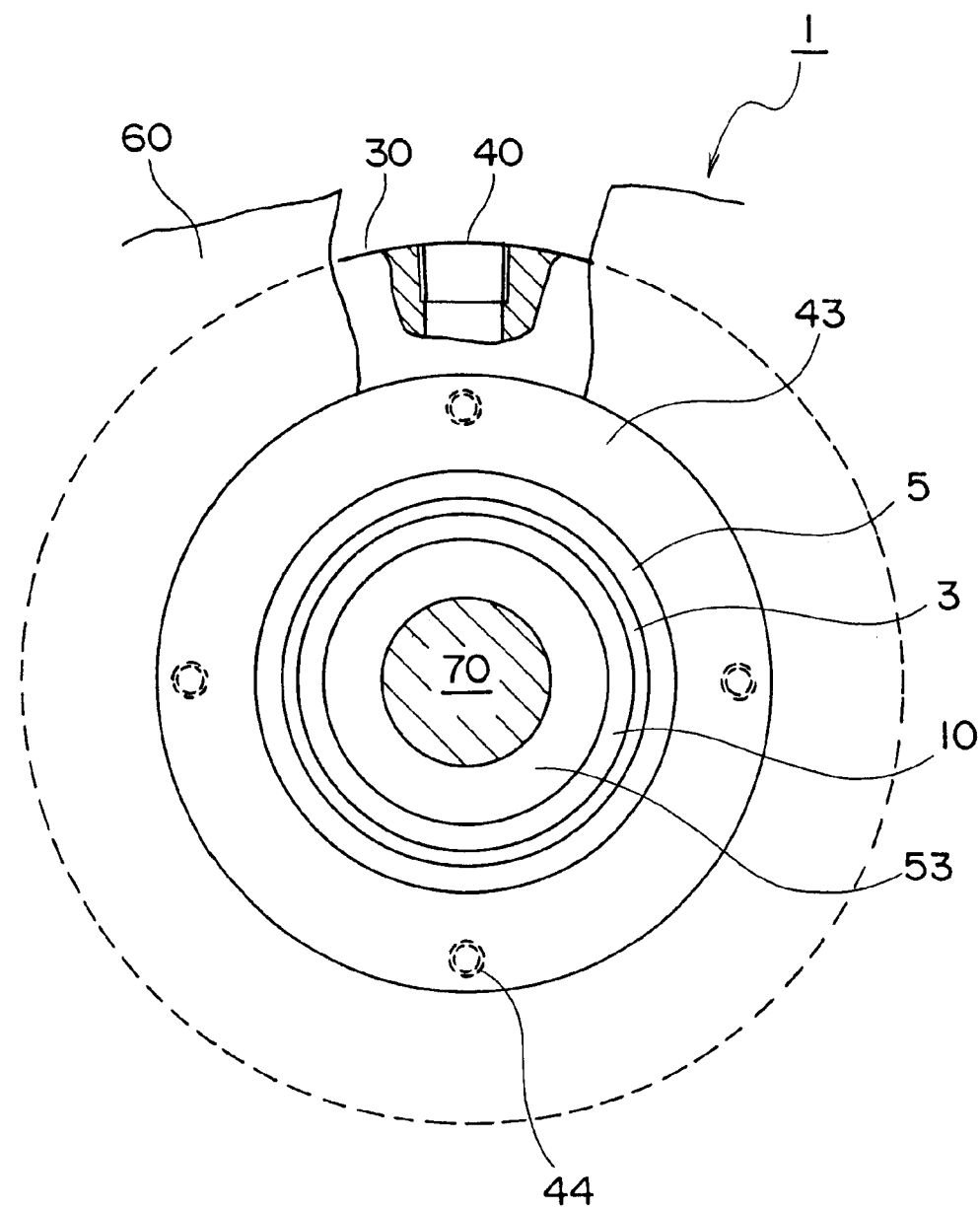
FIG. 2 is a side view, showing the mechanical sealing device in FIG. 1, as seen from the inside of the device body in the axial direction.

FIG. 2 shows the mechanical sealing device 1 in FIG. 1 as seen in the axial direction from the inside of the device body 60 to which the rotary shaft 70 is fitted.

The mechanical sealing device in FIG. 1 includes a seal flange 30 that is fixed to the external face 61 of the device body 60 through bolts 63. On the other hands, both a sleeve 53 fitted to the rotary shaft 70 and a seal collar also fitted to the outer surface of the sleeve 53 are securely fixed together to the rotary shaft 70 with a set screw 51. Then a plurality of set plates 55 are located on the side face of the seal flange 30 to position and fix the seal collar 50 relative to the seal flange 30.

The seal flange (attachment component) 30 to be mounted to the device body 60 is, as shown in FIG. 2, configured to be an annular disk and has four attachment through-holes 45 that are opened at both side faces and arranged with equal spacing to each other in the radial direction. The seal flange 30 is attached to the device body 60 through the attachment through-holes 45 with bolts 63.

The seal flange 30 is provided, in its inner circumferential surface, with a first attachment section 31 and a second attachment section 42 for attaching the first and second stationary seal rings 3, 21, respectively. The seal flange 30 is formed with a coolant passage space defining face 32 between the first and second attachment sections 31, 42 and also with a retaining face 33 on the outer circumference side of the first attachment section 31.

The seal flange 30 is provided with two or three pairs of a quenching liquid passage 40 and a quenching liquid drain port 41, which pairs are arranged to be equally spaced along the circumference. Each of the fluid passage 40 is formed so as to communicate with the liquid sealing device 2 side, inside of the inner circumferential surface, through a pipe thread portion 40A for connecting an external piping. And quenching liquid (fluid) is supplied directly to each of the seal faces 6,12 through the fluid passages 40, cools each of the seal faces 6, 12 heated by sliding heat generation, then passes through pumping holes 48 formed in the pumping ring 47 to the proximity of a second seal face 22 of a second stationary seal ring 21 in a second sealing device 20, and finally flows out of the drain ports 41. As a result, the quenching liquid cools the sliding faces of the first and second stationary seal rings 3, 21 and the first and second rotary seal rings 10, 23 and others.

The first attachment section 31 is provided with a fixing pin 35 that engages with an engaging groove 7 in the first stationary seal ring 3 to retain the first stationary seal ring 3 for preventing from rotating.

Further, to the retaining face 33 of the seal flange 30 is fitted with fluid tight the secured section 5B of the packing 5.

Further yet, at the outer circumferential surface of the seal flange 30 are opened four quenching liquid passages 40 that are arranged to be equally spaced along the circumference and passes to the proximity of the inner circumference on the first attachment section 31 where each passage 40 forms a passage space so that the quenching liquid communicate with the rear faces of the first stationary seal ring 3 and the packing 5. A fluid guide ring 46 is fixedly fitted with the fitting surface 38 of the seal flange 30 and arranged such that it blocks partially the opening of each fluid passage 40 at the inner circumference of the seal flange 30. The outer surface of the fluid guide ring 46 forms a fluid guide surface so as to introduce the quenching liquid to the vicinity of the first seal face 6 of the first stationary seal ring 3 and the rear of the packing 5.

The inner circumferential surface of the seal flange 30 defines the passage space surface 32, through which the quenching liquid passes. The seal flange 30 is also provided with drain ports 41 having a configuration similar to that of the fluid passage 40. The drain ports 41 are in communication with the fluid passages 40 through the inside of the passage space surface 32 and then the quenching liquid introduced from the fluid passages 40 passes through the passage space surface 32 to the drain ports 41.

The first stationary seal ring 3 has a first seal face formed at its one end and has circumferentially equally spaced grooves 7 at the other end. Further, the first stationary seal ring 3 has, at its rear end, a plurality of spring seats equally spaced circumferentially. Each spring 9 is seated on the spring seat to bias the first stationary seal ring 3 toward the first seal face 6. The outer circumferential surface of the first stationary seal ring 3 includes a contact face 3A and a support face 3B, both of which form a step in close contact with the packing 5. The first stationary ring seal 3 is made of material, such as silicone carbide, carbon and ceramics.

An inner step 13 of the first rotary seal ring 10 provided with a first relative seal face 12 is fitted with the outer corner of the flange 53A of a sleeve 53. The first rotary seal ring 10 is prohibited from rotating, since a groove 11 of the first rotary seal ring 10 engages a fixing pin 52 attached to the sleeve 53. Additionally, a stop ring 53B limits the first rotary seal ring 10 to displace in the axial direction. The first rotary ring seal 10 is made of material, such as silicone carbide, carbon and ceramics.

The packing 5 is made of a rubber in the shape of a circular ring. The packing 5 has a secured section 5B on its outer circumference and a seal lip section 5A on its inner circumference. The secured section 5B is fitted to the retaining face 33 of the seal flange 30.

Additionally, the secured section 5B of the packing 5 is retained at its rear face by a cover plate 43. This cover plate 43 extend toward the inner seal lip section 5A to cover approximate one half of the packing 5 on the sealed fluid side, thereby to protect the packing 5 from direct application of pressure of the sealed fluid.

In the packing 5 having the secured section 5B secured to the retaining face 33, the seal lip section 5A is fitted with fluid tight to the contact surface 3A formed in the shape of a step on the outer circumference of the first stationary seal ring 3 and biases the first stationary seal ring 3 toward the first seal face 6.

The material used for the packing 5 includes, for example, perfluoro elastomer, fluoro rubber, nitrile rubber, EPDM and polyester elastomer.

A seal collar 50 is formed to be a cylindrical tube and has a flange 50A at one end. The sleeve 53 is also formed to be a cylindrical tube and has a flange 53A at one end. The seal collar 50 is fitted to the sleeve 53 with their flanges 50A, 53A being opposed each other. The sleeve 53 is fitted with fluid tight to a rotary shaft 70 through an O-ring. The sleeve 53 and the seal collar 50 are secured to the rotary shaft 70 with a setscrew 51. As described previously, the inner circumferential surface of the first rotary seal ring 10 is fitted with fluid tight to the flange 53A of the sleeve 53 through the O-ring.

The cover plate 43 is formed to be in the shape of a ring with L-shape in its cross-section. The outer surface of the cover plate 43 fits with fluid tight to the inner surface 62 of a stuffing box 60 on the sealed fluid side and positions the seal flange 30 for attachment thereof. The cover plate 43 is formed with female threads engaged with bolts 44 to allow to fasten easily by access from the outside on the atmosphere side, which facilitates to position and mount the seal flange 30.

Additionally, the annular cover plate 43 is formed with a radially outer section for retaining the secured section 5B to prevent from displacing and a radially inner section extending to the middle of the packing 5 on the sealed fluid side for covering and also preventing the sealed fluid pressure from acting on the packing 5.

Within a space 32A formed inside of the passage space surface 32, a pumping ring 47 is fixedly fitted to engage the rotary shaft 70 through an O-ring. The pumping ring 47 is provided with pumping holes 48. Recesses 57A formed in the inner circumference of the pumping ring 47 engage projections 57B formed at the cylindrical end of the seal collar 50. Accordingly, the pumping ring 47 and the rotary shaft 70 can rotate together.

Within the space 32A of the seal flange 30 on the external side of the device body is provided a second sealing device 20.

The second sealing device 20 functions to seal for preventing the quenching liquid from flowing out. The second sealing device 20 is provided with a second stationary seal ring 21. A second seal face 22 is formed at one end of the second stationary seal ring 21. The second sealing device 20 is movably fitted to the fitting surface 36 of the inner circumference of the seal flange 30, while a second stationary seal ring 21 is held not to rotate, since grooves 25 formed in the outer circumference of its flange are engaged with corresponding fixing pins of the second attachment section 42. Further, the second stationary seal ring 21 is pushed on its rear, toward the second seal face 22 by a second spring 28.

The second rotary seal ring 23 in close contact with the mating second stationary seal ring 21 is provided with a second relative seal face 24. The second relative seal face 24 contacts, with fluid tight, the second seal face 22 of the second stationary seal ring 21. The outer circumference of the second rotary seal ring 23 is fitted to an attachment step 47A of the pumping ring 47 through an O-ring. Grooves 26 of the second rotary seal ring 23 are engaged with fixing pins 49 secured to the pumping ring 47. Then the second rotary seal ring 23 couples with the pumping ring 47 to be rotated by the rotary shaft 70.

The second stationary seal ring 21 and rotary seal ring 23 are made of silicone carbide, carbon, ceramics or others.

Figure 3A:
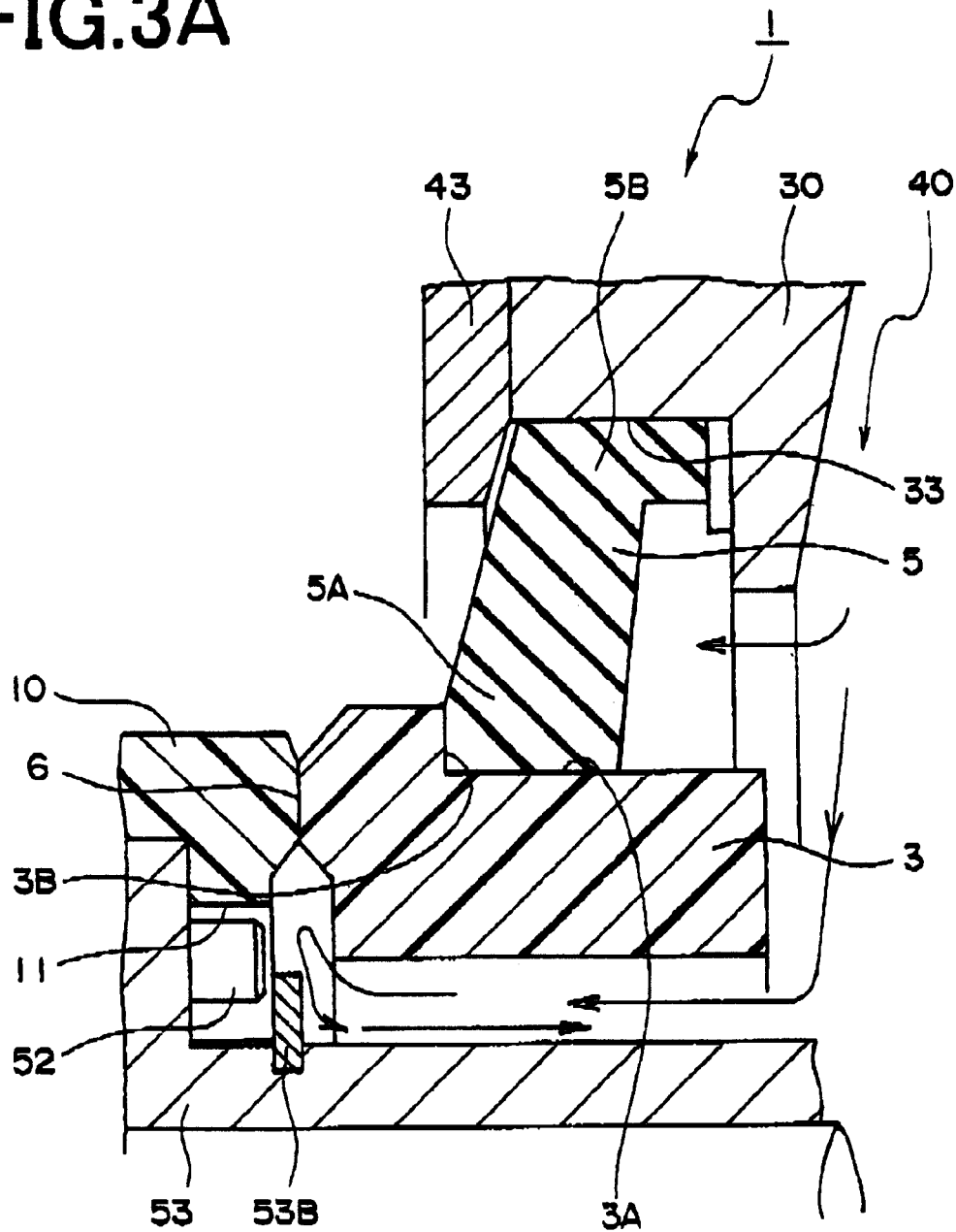
FIG. 3A is an enlarged half-sectional view of FIG. 1.
Figure 3B:
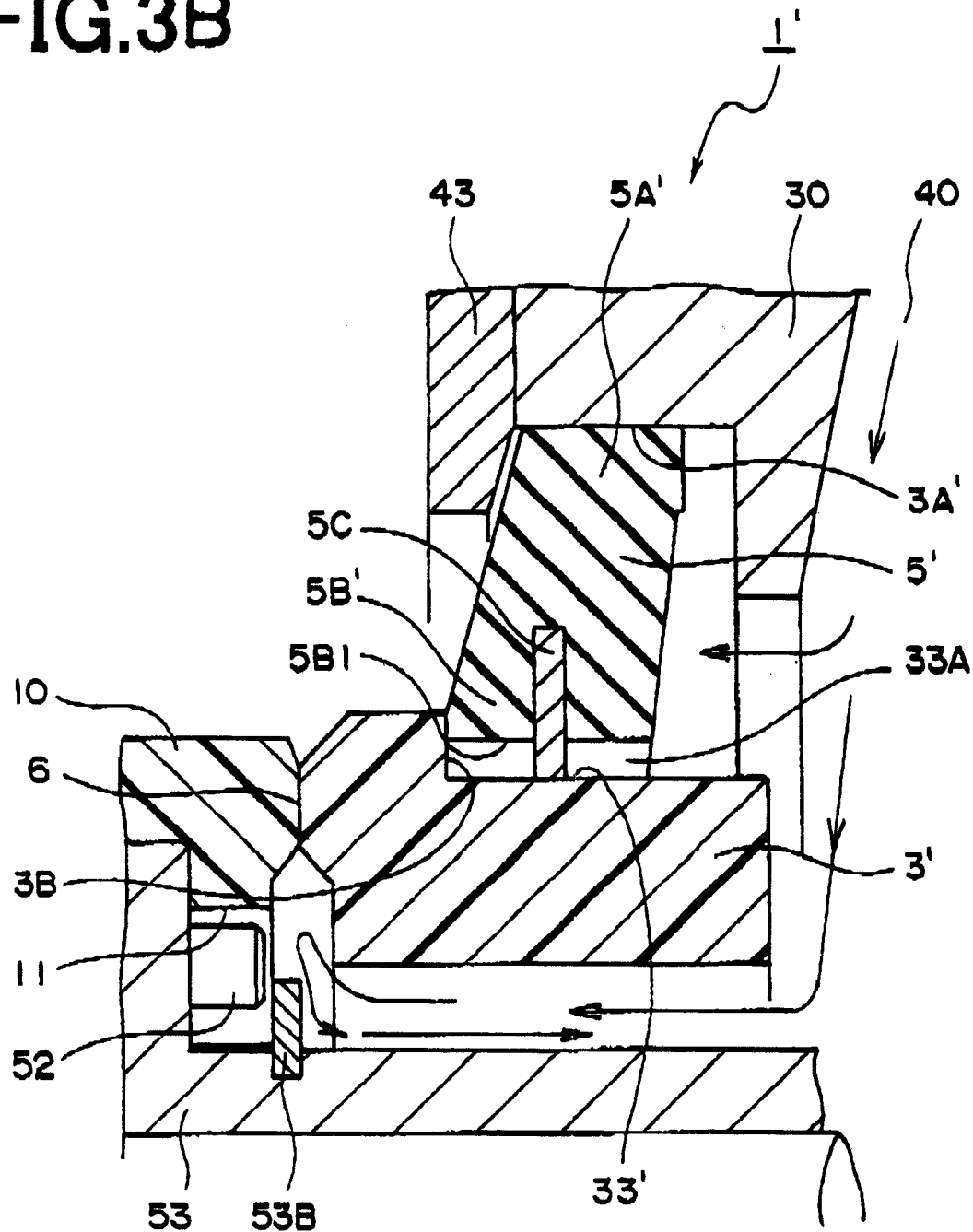
FIG. 3B is a half sectional view, showing a liquid sealing device of a mechanical sealing device as the second preferred embodiment according to the invention.

FIG. 3B shows a mechanical sealing device as the second preferred embodiment according to the invention.

The configuration of the mechanical sealing device in FIG. 3B is approximately same to that of the mechanical sealing device 1 as shown in FIG. 1 and FIG. 3A. They are different in the packing 5' and the first stationary seal ring 3'. A secured section 5B' located on the radially inner side of the packing is fixedly fitted with fluid tight to the first stationary seal ring 3'. In the secured section 5B' is embedded a metallic reinforcement ring 5C'. Three recesses 5B1 are provided along the inner circumference of the secured section 5B' such that they are equally spaced. By the engagement of the recesses 5B1 of the secured section 5B' with the projections 33A' formed in the retaining face 33 on the radially outer side of the first stationary seal ring 3', the packing 5' can retain the first stationary seal ring 3' to prevent from rotating due to sliding motion with the first rotary seal ring 3'.

In such mechanical sealing device 1' constituted as described, as the second embodiment, the secured section 5B' of the packing 5' is fixedly fitted with fluid tight to the retaining face 33' of the first stationary seal ring 3', while the seal lip section 5A' closely contact a contact face 3A' of the seal flange 30. When the packing 5' is subject to the pressure of the sealed fluid, it resiliently deforms itself corresponding thereto. If the pressure more than the limit of elasticity is applied, then the seal lip section 5A' is adapted to slightly displace. Accordingly, the first stationary seal ring 3' is allowed to move in response to the surface pressure of the first seal face 6, regardless of the presence of slurries contained in fluid.

Figure 4:
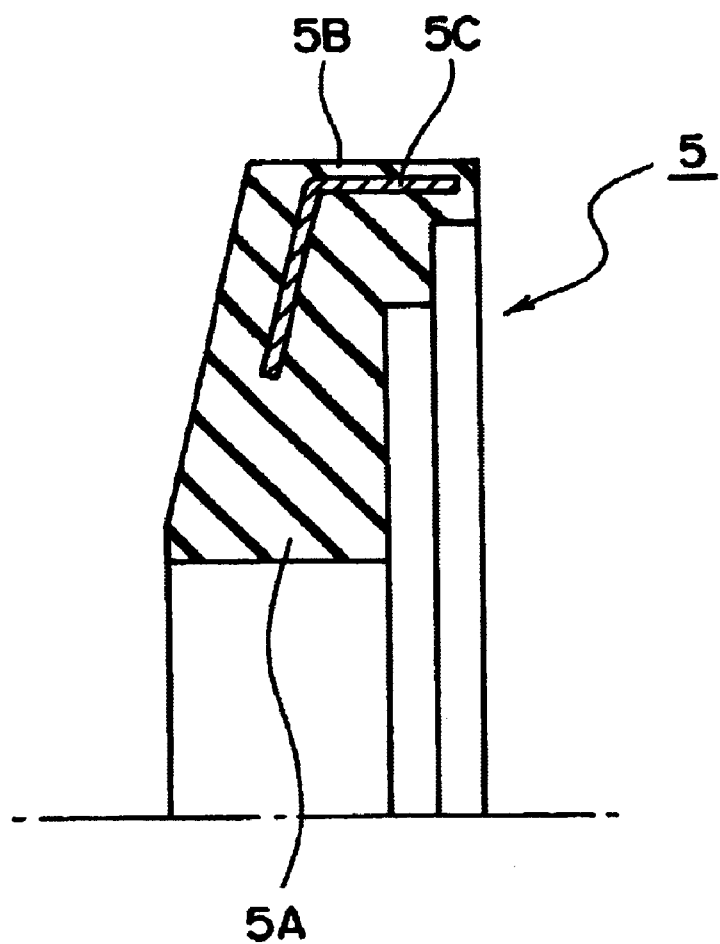
FIG. 4 is a half sectional view, showing a packing as the third preferred embodiment according to the invention.
Figure 5:
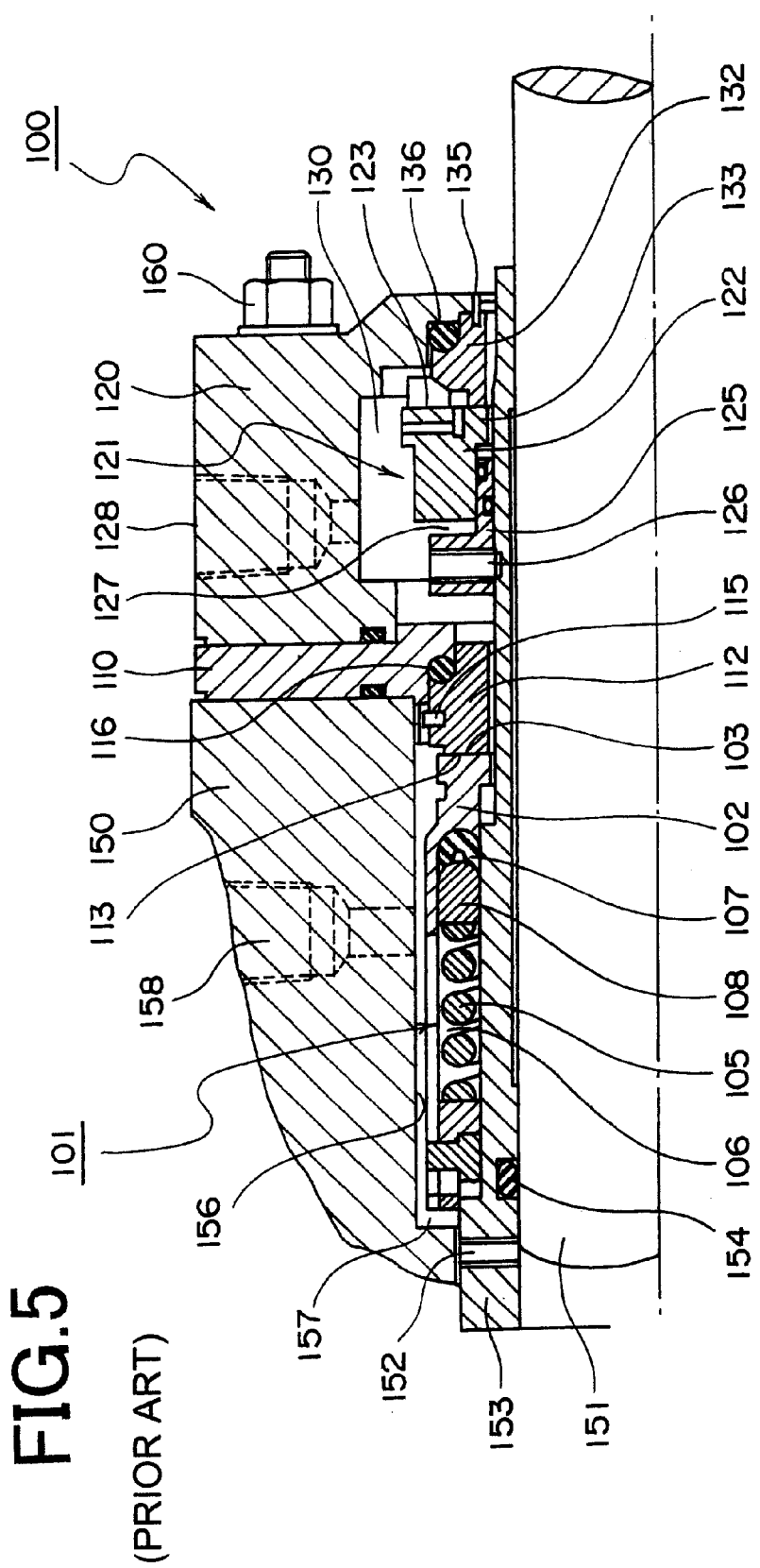
FIG. 5 is a sectional view, showing a mechanical seal as the first related art of the invention.
Figure 6:
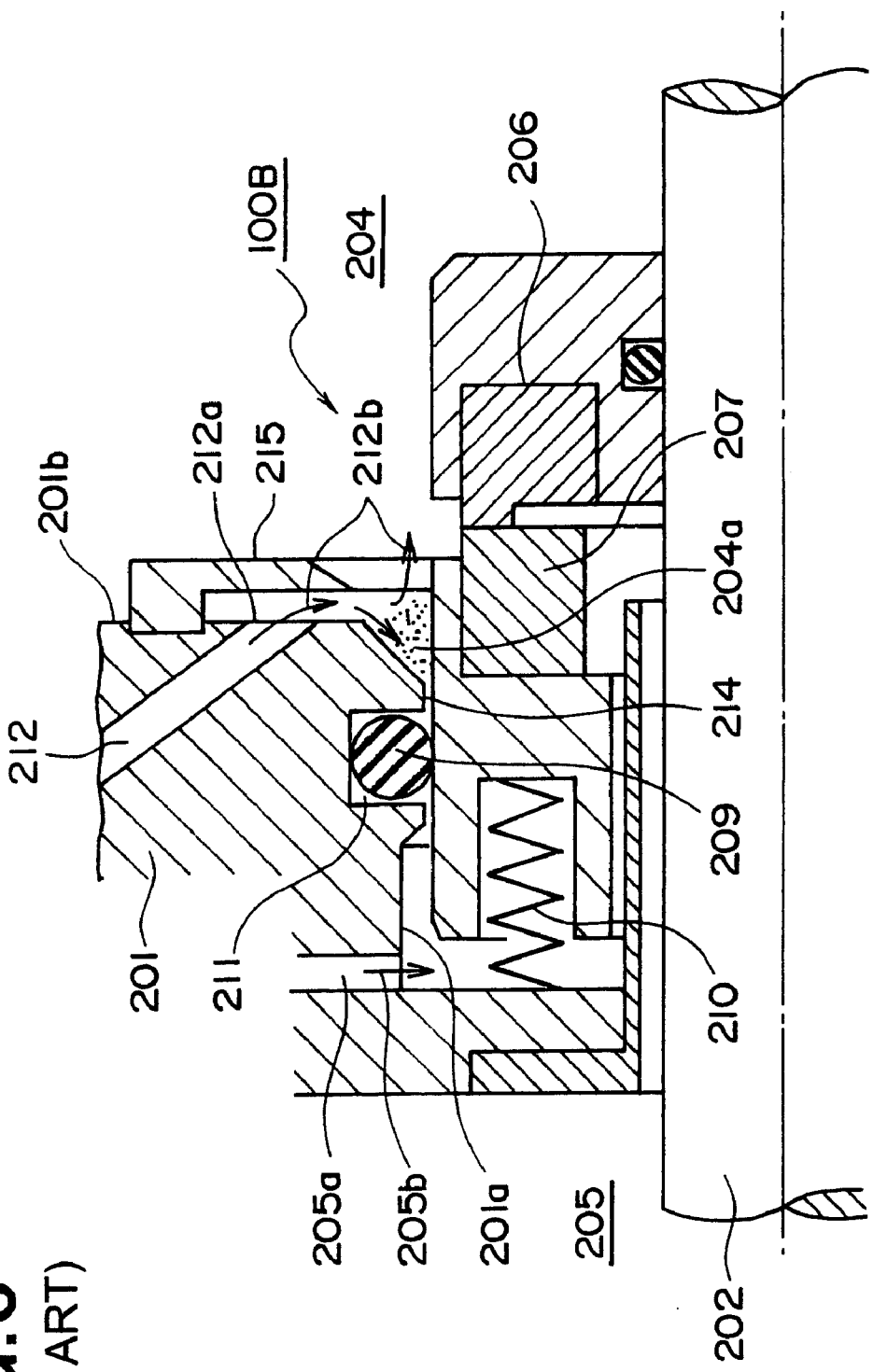
FIG. 6 is a sectional view, showing a mechanical seal as the third related art of the invention.

FIG. 4 shows a packing to be attached to a mechanical sealing device 1 as the third preferred embodiment according to the invention. The packing 5 has a secured section 5B on its radially outer side. In the secured section 5 is embedded a reinforcement ring 5C. The secured section 5B of the packing 5 is fixedly fitted to the retaining face 33 of the seal flange 30 into one piece. Also, the seal lip 5A on the radially inner side is fitted with fluid tight to a contact face 3A of a step located on the radially outer side of the first stationary seal ring 3.

This embodiment operates in the same manner as in the mechanical sealing devices of the first and second embodiments and exerts in response to the surface pressure applied on the seal face 6 of the first stationary seal ring 3, regardless of whether or not any impurities is contained.

As a result, any deficiency in the seal rings could not be brought about, even though the liquid to be sealed is high viscosity fluid or slurry contained fluid and thus the sealing ability of the sealing device is fully exerted.

In the mechanical sealing device 1 constituted as described, the seal flange 30 and the seal collar 50 are positioned by the set plates 55 to be mounted. Each of the set plates 55 has a sectional shape as shown by a phantom line and they are placed circumferentially to be equally spaced on the side face of the seal flange 30 and secured with bolts 59. Engagement grooves 56 are engaged with positioning projections 37 of the seal collar 50 to position the seal collar 50 and the seal flange 30, which are subsequently fixed together to the rotary shaft 70 with a setscrew 51.

The set plates 55 for positioning and securing are to be removed after assembling work.

Next, for a passage for quenching liquid, the quenching liquid is pumped by a pump M to the fluid passage 40 formed in the mechanical sealing device 1. The quenching liquid (fluid) through the fluid passage 40 acts on the rear face of the packing 5 to push the first seal face 6 of the first stationary seal ring 3 against the first relative seal face 12 of the first rotary seal ring 10. At the same time, the fluid that was deflected by the outer surface of a fluid guide ring 46 flows through the passage formed on the outer circumference side to the vicinity of the inside of each seal faces 6, 12 to cool the first stationary seal ring 3 and the first rotary seal ring 10. Then the fluid flows back through the inner circumference side of the fluid guide ring 46 to pumping holes 48 of a pumping ring 47 and then to a second sealing device 20. The second sealing device 20 is cooled by the fluid. The fluid exits drain holes 41 and cooled during flowing through a cooler R in communication with the pump M for circulation of the fluid, as described.

Thus, the sealing ability is exerted in a manner such that the first stationary seal ring 3 is subject to pressure at its rear of the packing 5 from the quenching liquid and at the same time the first stationary seal ring 3 is also biased directly by the quenching liquid. Further, the first stationary seal ring 3 is always biased by a spring 9. Accordingly, the sealing ability is allowed to fully exert when the fluid to be sealed has high pressure. Also, since the quenching liquid flows to the first stationary seal ring 3 and the first rotary seal ring 10 and cools them for preventing heat generation, any heat deformation due to heat generation in the first seal face 6 of the stationary seal ring 3 and the relative seal face 12 of the first rotary seal ring 10 is avoided and thus any damage involved with the heat deformation is effectively prevented.

Additionally, slurries contained in the sealed fluid does not inversely affect on the responsive movement of the first stationary seal ring 3 because of the responsive elastic deformation of the packing 5. Accordingly, the mechanical sealing device 1 providing superior effects is obtained, in which the surface pressure is fully exerted to improve the sealing ability regardless of the problem involved with high viscosity fluid and slurry contained fluid.

Now, further embodiments having constitutions and effects will be described hereinafter.

In the mechanical sealing device 1 as the second embodiment according to the invention, it is preferred to constitute the fluid passage 40 where the fluid flows to the sealed fluid side and the opposite side thereof between the faces of the first stationary seal ring 3 and the first rotary seal ring 10 as well as the sealed fluid side and the opposite side thereof of the packing 5.

In the mechanical sealing device 1 as the second embodiment according to the invention, the fluid passage is in communication with the proximity of the radially inner side opposing the seal surface of each seal ring and also with the rear of the packing 5 opposing the sealed fluid side. Therefore, each seal face of the seal rings and the packing can be cooled and it is allowed to effectively prevent damages on the seal rings and the packing due to heat generation.

Further, the sealing ability can be fully exerted since the rear of the packing is pushed by the fluid to cause the seal face of the first stationary seal ring to be also pushed, resulting in creation of surface pressure on the seal face.

In the mechanical sealing device 1 as the third embodiment according to the invention, it is preferred for the mechanical sealing device 1 to be constituted such that the secured section 5B is fixedly fitted to the retaining face 33 of the seal flange 30, and the seal lip section 5A is engaged with the contact face 3A of the stationary seal ring 3.

In the mechanical sealing device according to the third embodiment of the invention, it is allowed to increase the surface pressure of the first seal face since the packing is pushed by cooling liquid (quenching liquid) to cause the first stationary seal ring to be pushed. Further, allowed to increase the surface pressure on the first seal face by the action of cooling liquid pressure on the rear of the first stationary seal ring. As a result, the sealing ability of the first seal face can be improved.

In the mechanical sealing device 1 as the forth embodiment according to the invention, it is preferred for the mechanical sealing device to be constituted such that a reinforcement ring 5C is provided in the secured section 5B or the seal lip section 5A.

In the mechanical sealing device according to the forth embodiment of the invention, since a reinforcement ring is provided in the secured section or the seal lip section, the secured section or the seal lip section can be securely contacted with or fixedly secured to the mating retaining face or contact face. It is allowed to exert pressure resistance of the attached secured section as well as the coupling force of the seal lip section.

In the mechanical sealing device 1 as the fifth embodiment according to the invention, it is preferred for the mechanical sealing device to be constituted such that a cover plate 43 attached to the seal flange 30 is provided for covering the sealed fluid side of the packing 5.

In the mechanical sealing device according to the fifth embodiment of the invention, the cover plate is attached to the seal flange on the sealed fluid side of the packing. Accordingly, it is allowed to increase the pressure resistance of the packing and securely retain the packing.

According to the mechanical sealing device 1 of the invention, following effects are derived.

In the mechanical sealing device 1 of the invention, the packing is, at its secured section, fixed on the retaining surface on one side, while, at free end of its seal lip section, closely contact the mating surface on the other side. Accordingly, when slurry contained fluid sticks, the packing deforms elastically at the seal lip section thereof, enabling the response to the surface pressure applied to the stationary seal ring to be always fully exerted.

The fluid passage is in communication with the proximity of the radially inner side opposing the seal face of each seal ring and also with the rear of the packing 5 opposing the sealed fluid side. Therefore, each seal face of the seal rings and the packing can be cooled and it is allowed to effectively prevent damages on the seal rings and the packing due to heat generation.

At the same time, the sealing ability can be exerted since the rear of the packing is pushed by the fluid to cause the first seal face of the first stationary seal ring to be additionally pushed, resulting in creation of surface pressure on the seal face.

Further, according to the mechanical sealing device 1 of the invention, it is allowed to increase the surface pressure of the first seal face since the packing is pushed by cooling liquid (quenching liquid) to cause the first stationary seal ring to be pushed. Further, it is also allowed to increase the surface pressure on the first seal face by the action of cooling liquid pressure on the rear of the first stationary seal ring. As a result, the seal face of the first sealing device is always fully applied with pushing force. Accordingly, the sealing ability of the first seal face can be securely improved, regardless of the degree of the pressure applied by the sealed fluid.

Also, according to the mechanical sealing device 1 of the invention, since a reinforcement ring is provided in the secured section or the seal lip section, the secured section or the seal lip section can be securely contacted with or fixedly secured to the mating retaining face or contact face. It is allowed to exert pressure resistance as well as the coupling force of the seal lip section.

Further yet, according to the mechanical sealing device 1 of the invention, the cover plate is attached to the seal flange on the sealed fluid side of the packing. Accordingly, it is allowed to increase the pressure resistance of the packing and securely retain the packing. Additionally, the mechanical sealing device is extremely easy to be attached to the device body by use of the cover plate.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A mechanical seal installed between a rotary shaft and a seal flange for sealing a sticky composition contained fluid including a slurry, comprising:

a first rotational seal ring having a relative seal face and retained with the rotary shaft;

a first stationary seal ring having a seal face in close contact with the relative seal face and biased with a resilient means supported by the seal flange, the first stationary seal ring being engaged with the seal flange and an annular packing ring having a substantially rectangular cross section made of elastic material, the annular packing ring having a secured section fixed to a retaining face on one side between the first stationary seal ring and the seal flange and having a seal lip section fitting with fluid tight to a contact face of the stationary seal ring on the other side, the packing ring biasing the first stationary seal ring toward the first rotational seal ring because of a pressurized quenching fluid pressing the seal lip section of the packing ring onto the first stationary seal ring or the seal flange, the pressurized fluid flowing in a quenching fluid passage formed in the seal flange.

2. The mechanical seal of claim 1, wherein the pressurized quenching fluid is cooler than the sealed fluid in order for cooling contacting faces between the first stationary seal ring and the first rotational ring.

3. The mechanical seal of claim 1, wherein the secured section of the packing ring is fixed to a retaining face of the seal flange, and the seal lip section is engaged with the contact face of the stationary seal ring.

4. The mechanical seal of claim 1, further comprising a reinforcement ring mounted in the secured section of the packing ring.

5. The mechanical seal of claim 1, further comprising a cover plate attached to the seal flange for covering the a sealed fluid side of the packing ring.

6. The mechanical seal of claim 5, wherein the cover plate comprises a ring with an L-shaped cross section.

7. The mechanical seal of claim 1, wherein the seal face of the first stationary seal ring comprises circumferentially equally spaced grooves.

8. The mechanical seal of claim 1, wherein the resilient means comprises a spring.

* * * * *